United States Patent
Chen et al.

(10) Patent No.: US 12,194,711 B1
(45) Date of Patent: Jan. 14, 2025

(54) METHOD FOR PREPARING LAMINATED GLASS

(71) Applicant: Furcifer Inc., Fremont, CA (US)

(72) Inventors: Zhao Chen, Camarillo, CA (US); Yan Zhou, Fremont, CA (US); Jian Wang, Fremont, CA (US); Zhimin Fu, Jiangsu (CN); Miaozi Li, Jiangsu (CN); Yuanyuan Zhang, Jiangsu (CN); Min Tang, Jiangsu (CN)

(73) Assignee: Furcifer Inc., Fremont, CA (US)

( * ) Notice: Subject to any disclaimer, the term of this patent is extended or adjusted under 35 U.S.C. 154(b) by 0 days.

(21) Appl. No.: 18/473,747

(22) Filed: Sep. 25, 2023

(30) Foreign Application Priority Data

Jul. 26, 2023 (CN) .......................... 202310921292.1

(51) Int. Cl.
| | | |
|---|---|---|
| *G02F 1/1333* | (2006.01) | |
| *B32B 17/10* | (2006.01) | |
| *G02F 1/1343* | (2006.01) | |

(52) U.S. Cl.
CPC .... *B32B 17/1088* (2013.01); *B32B 17/10036* (2013.01); *B32B 17/10376* (2013.01); *B32B 17/10504* (2013.01); *B32B 17/1055* (2013.01); *B32B 17/10733* (2013.01); *B32B 17/10779* (2013.01); *G02F 1/133302* (2021.01); *G02F 1/134309* (2013.01); *B32B 2307/202* (2013.01); *G02F 2201/50* (2013.01); *G02F 2202/28* (2013.01)

(58) Field of Classification Search
CPC .......... B32B 17/1088; B32B 17/10036; B32B 17/10376; B32B 17/1055; B32B 17/10733; B32B 17/10779; B32B 2307/202; G02F 1/133302; G02F 1/134309; G02F 2201/50; G02F 2202/28
See application file for complete search history.

(56) References Cited

U.S. PATENT DOCUMENTS

| | | | |
|---|---|---|---|
| 2021/0018809 A1* | 1/2021 | Takahashi | ......... G02F 1/133311 |
| 2022/0250359 A1* | 8/2022 | Gima | ................ B32B 17/10036 |

* cited by examiner

*Primary Examiner* — Mariam Qureshi
(74) *Attorney, Agent, or Firm* — Sheppard Mullin Richter & Hampton LLP

(57) ABSTRACT

This application provides a method for preparing laminated glass sandwiching an electronic device. The device may include a device body, a conductive substrate, a conductive adhesive tape electrode, and a lead-out electrode. The conductive adhesive tape electrode has at least one surface coated with conductive adhesive and is attached to the conductive substrate, the lead-out electrode is placed on the conductive adhesive tape electrode or the conductive substrate and is conductively connected to the conductive adhesive tape electrode. The preparing method may include placing a protective layer on the conductive adhesive tape electrode, covering and sealing the conductive adhesive tape electrode onto the conductive substrate; and sandwiching the electronic device between two glass pieces and pressing the two glass pieces together to form the laminated glass.

14 Claims, 3 Drawing Sheets

METHOD FOR PREPARING LAMINATED GLASS

CROSS-REFERENCE TO RELATED APPLICATIONS

This application claims priority to Chinese Patent Application No. 202310921292.1 filed on Jul. 26, 2023. The entire content of the above-identified application is incorporated herein by reference.

TECHNICAL FIELD

This application relates to the field of glass technology, specifically a method for preparing laminated glass.

BACKGROUND

There is a significant demand for glass in the automotive and construction industries. Considering safety factors, laminated glass, consisting of glass layers with an interlayer adhesive, is commonly used. When laminated glass breaks due to external forces, the interlayer adhesive prevents glass fragments from scattering, enhancing safety. In recent years, various applications have emerged that combine electronic devices with laminated glass. These electronic devices are situated between two glass layers with interlayer adhesive, and they communicate with or are powered by external connections through lead-out electrodes. This imparts additional functionalities to laminated glass. However, electronic devices often fail shortly after lamination, typically within a few days or weeks, making it impossible to maintain their normal operational state.

SUMMARY

The objective of this application is to provide a method for preparing laminated glass that solves the problem of electronic devices failing shortly after lamination, all while maintaining a low-cost approach. The specific technical solutions are as follows:

This application provides a method for preparing laminated glass, wherein the laminated glass includes one or more electronic devices. Each electronic device includes a device body, a conductive substrate, a conductive adhesive tape electrode, and a lead-out electrode. The conductive adhesive tape electrode has a conductive adhesive on at least one surface, and this adhesive surface is bonded to the conductive substrate. The lead-out electrode is placed on the conductive adhesive tape electrode or the conductive substrate and is electrically connected to the conductive adhesive tape electrode. The method involves: placing a protective layer on the conductive adhesive tape electrode, covering it, and sealing the conductive adhesive tape electrode onto the conductive substrate; clamping the electronic devices between two glass layers to form laminated glass that contains the electronic devices; and on the side of at least one of the two glass layers facing the electronic device, applying interlayer adhesive and extending the lead-out electrode to the outer side of the two glass layers.

In some embodiments of this application, conductive adhesive is applied to both surfaces of the conductive adhesive tape electrode, which attaches the protective layer to the conductive adhesive tape electrode.

In some embodiments of this application, the protective layer's thickness ranges from 10 μm to 1000 μm.

In some embodiments of this application, the protective layer can be chosen from at least one of protective films and protective adhesives. Protective films include polyethylene terephthalate (PET) films, polyimide (PI) films, epoxy films, polyethylene (PE) films, and polypropylene (PP) films. Protective adhesives include epoxy resin, ultraviolet-cured adhesive (UV adhesive), two-component epoxy adhesive (AB adhesive), conductive copper adhesive, and conductive silver adhesive.

In some embodiments of this application, the protective layer is a protective film. This layer can be directly applied to the conductive adhesive tape electrode.

In some embodiments of this application, the protective layer is a protective film. Conductive adhesive is applied to both surfaces of the conductive adhesive tape electrode, and the protective film is fixed to one surface of the conductive adhesive tape electrode using the conductive adhesive.

In some embodiments of this application, the protective layer is a protective film. The protective film extends between the conductive substrate and the interlayer adhesive and partially covers the conductive substrate.

In some embodiments of this application, the protective layer is a protective adhesive. This adhesive is applied to the conductive adhesive tape electrode using a spot bonding method, sealing the conductive adhesive tape electrode onto the conductive substrate.

In some embodiments of this application, the protective layer is chosen from both protective films and protective adhesives. In this case, a protective adhesive is applied to the conductive adhesive tape electrode using a spot bonding method, sealing the conductive adhesive tape electrode onto the conductive substrate, and the protective film covers the protective adhesive.

The electronic devices can be chosen from liquid crystal devices, electrochromic devices, organic light-emitting devices, thin-film heating devices, and thin-film solar cell devices. Technical advantages:

This application provides a method for preparing laminated glass, wherein the laminated glass includes electronic devices. These electronic devices consist of a device body, a conductive substrate, a conductive adhesive tape electrode, and lead-out electrode. The conductive adhesive tape electrode has a conductive adhesive on at least one surface, and this adhesive surface is bonded to the conductive substrate. The lead-out electrode is placed on the conductive adhesive tape electrode or the conductive substrate and are electrically connected to the conductive adhesive tape electrode. The method involves placing a protective layer on the conductive adhesive tape electrode, covering it, and sealing the conductive adhesive tape electrode onto the conductive substrate. The electronic devices are then clamped between two glass layers, forming laminated glass. On the side of the glass facing the electronic devices, interlayer adhesive is applied, and the lead-out electrode extends to the outer side of the glass. This application addresses the issue of electronic devices failing shortly after lamination in laminated glass by adding a protective layer to the conductive adhesive tape electrode, achieving a cost-effective solution.

It is important to note that not all the advantages mentioned above need to be achieved simultaneously in every implementation of this application.

BRIEF DESCRIPTION OF THE DRAWINGS

For a clearer understanding of the embodiments or technical solutions in this application and the prior art, the accompanying drawings will be briefly introduced. It is

Figure Markings: 1: Glass; 2: Interlayer Adhesive; 3: Protective Layer; 4: Metal Film; 5: Conductive Adhesive; 6: Electronic Device; 7: Lead-out Electrode.

DETAIL DESCRIPTION OF THE EMBODIMENTS

The following will provide a clear and complete description of the technical solution in the embodiments of this application, combined with the drawings in the embodiments of this application. Obviously, the described embodiments are only a part of the embodiments of this application, not all of them. Those skilled in the art based on all other embodiments obtained from this application belong to the scope protected by this application.

Figure 1:
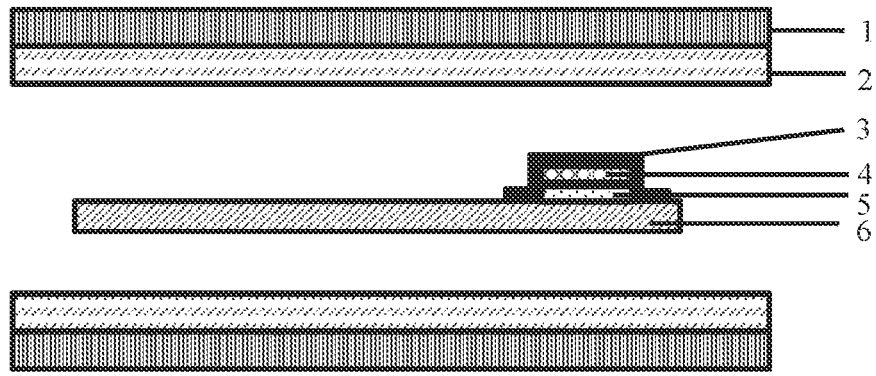
FIG. 1: A schematic diagram of the disassembled structure of laminated glass containing electronic devices, as prepared in Example 1 of this application.
Figure 7:
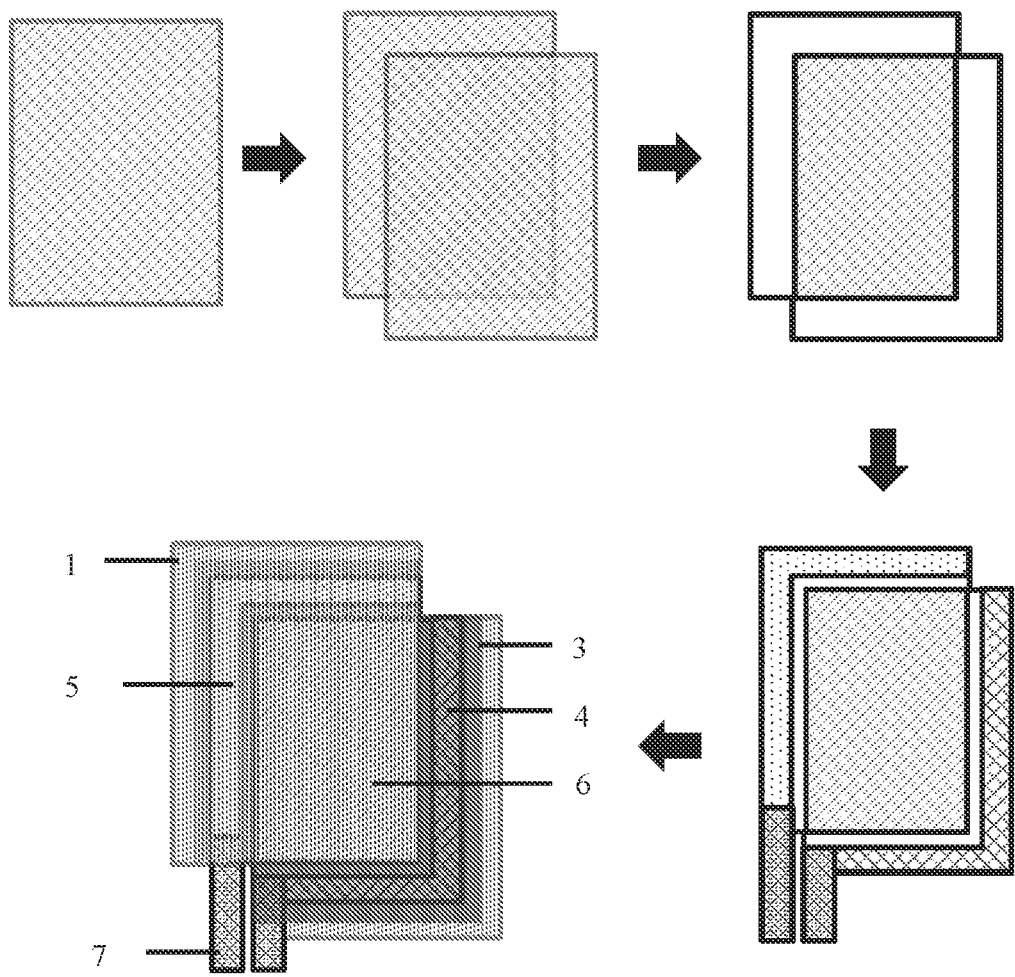
FIG. 7: A schematic diagram of the process for preparing laminated glass containing electronic devices in one embodiment of this application.

Referring to FIGS. 1 and 7, this application provides a method for preparing laminated glass. The laminated glass includes an electronic device 6. The electronic device 6 includes a device body, a conductive substrate, a conductive adhesive tape electrode, and a lead-out electrode 7. At least one surface of the conductive adhesive tape electrode is provided with conductive adhesive 5, and the surface with conductive adhesive 5 is bonded to the conductive substrate. The lead-out electrode 7 is set on the conductive adhesive tape electrode or the conductive substrate and is conductively connected with the conductive adhesive tape electrode. The method includes:

Setting a protective layer 3 on the conductive adhesive tape electrode. The protective layer 3 covers the conductive adhesive tape electrode and seals the conductive adhesive tape electrode on the conductive substrate.

Clamping the electronic device 6 between two glass pieces 1 for pressing to form the laminated glass containing the electronic device.

In some embodiments, the glass 1 has interlayer adhesive 2 on one side facing the electronic device 6, and the lead-out electrode 7 extends to the outside of the glass 1.

In the prior art, to address the issue of electronic devices failing shortly after the pressing process and bonding with interlayer adhesive and glass, protective films or adhesives are often used to tightly encapsulate electronic devices. However, when laminated glass containing electronic devices is used in industries such as automotive and construction, where the glass area is often large, the existing method of tightly encapsulating electronic devices leads to issues of complex processes, long processing times, and high costs. Furthermore, the location and mechanism of electronic device failure are currently unclear to those skilled in the art.

The inventors of this application have found through in-depth research that during the preparation process of interlayer adhesive, plasticizers and additives are often introduced to make it flexible and easy to process. However, these plasticizers, additives, and external moisture and oxygen can penetrate into the electronic device. They react with the conductive adhesive in the conductive adhesive tape electrode, leading to a reduction in the conductivity of the conductive adhesive tape electrode and causing the failure of the electronic device. This application addresses this issue by placing a protective layer 3 on the conductive adhesive tape electrode of electronic device 6, sealing the conductive adhesive tape electrode onto the conductive substrate. This prevents the diffusion of plasticizers, additives, and external moisture and oxygen from the interlayer adhesive 2 into the conductive adhesive tape electrode, effectively solving the problem of early failure of electronic devices in the completed interlayer glass. Additionally, compared to the existing overall encapsulation methods for electronic devices, the preparation method proposed in this application significantly reduces costs. In this application, "early failure" refers to a significant drop in operating current within 1 to 7 days of completion of the interlayer process, rendering the electronic device unable to maintain normal operation.

The conductive adhesive tape, as a means of electrode extraction for electronic devices, consists of a metal film 4 and conductive adhesive 5. When used, the conductive adhesive tape is adhered to the electronic device 6, and conductive adhesive 5 facilitates the conduction of current or voltage between the electronic device 6 and the metal film 4. In some embodiments of this application, at least one surface of the conductive adhesive tape electrode is equipped with conductive adhesive 5. Specifically, the conductive adhesive 5 on the conductive adhesive tape electrode can be arranged in three ways: conductive adhesive 5 is located on one surface of the conductive adhesive tape electrode that contacts the conductive substrate of the electronic device 6, while the opposing surface does not have any adhesive material; conductive adhesive 5 is present on both the surface of the conductive adhesive tape electrode that contacts the conductive substrate of the electronic device 6 and the opposing surface; conductive adhesive 5 is on one surface of the conductive adhesive tape electrode that contacts the conductive substrate of the electronic device 6, while the opposing surface has a non-conductive adhesive.

Having conductive adhesive 5 on one surface of the conductive adhesive tape electrode enables its bonding to the conductive substrate of the electronic device, while the other surface, with conductive adhesive 5 or non-conductive adhesive, can secure the material covering the conductive adhesive tape electrode. This application does not place any particular restrictions on the type of conductive adhesive 5 used, as long as it achieves the objectives of this application. For example, conductive adhesive 5 can include but is not limited to acrylic pressure-sensitive conductive adhesive or a conductive adhesive obtained by mixing conductive fillers with a matrix of polyimide, phenolic resin, or polyurethane. There are no specific limitations on the type of metal for metal film 4 in this application, as long as it fulfills the objectives of this application. For example, metals may include but are not limited to copper, silver, or aluminum, among others.

The types of interlayer adhesive 2 are not specifically limited in this application, as long as they achieve the objectives of this application. For example, interlayer adhesive 2 can include but is not limited to polyvinyl butyral (PVB), ionomer interlayer (SentryGlas), ethylene-vinyl acetate copolymer (EVA), or polyurethane (PU). Preferably, interlayer adhesive 2 is selected from PVB.

The types of lead-out electrode 7 are not specifically limited in this application, as long as they achieve the objectives of this application. For example, lead-out electrode 7 can include but is not limited to flexible film electrodes or metal-coated wire. The aforementioned flexible film electrode can be made of copper, aluminum, silver, or their combinations, and coated with polymer on the outer surface.

In some embodiments of this application, conductive adhesive 5 is placed on both surfaces of the conductive adhesive tape electrode, and protective layer 3 is attached to the conductive adhesive tape electrode using conductive adhesive 5. This reduces the steps required for preparing the interlayer glass as proposed in this application, making the preparation process more convenient and facilitating a low-cost solution to the problem of early failure of electronic devices in the completed interlayer glass.

In some embodiments of this application, the thickness of protective layer 3 ranges from 10 μm to 1000 μm. For instance, the thickness of protective layer 3 can be 10 μm, 200 μm, 400 μm, 600 μm, 800 μm, 1000 μm, or any range in between. Controlling the thickness of protective layer 3 within the scope of this application effectively safeguards the conductive adhesive tape electrode while preventing excessive material use in protective layer 3, thus avoiding wastage. This is advantageous for addressing the problem of early failure of electronic devices in the completed interlayer glass in a cost-effective manner.

In some embodiments of this application, protective layer 3 is selected from protective films and protective adhesives. Specifically, protective layer 3 can be chosen from either protective films or protective adhesives, or a combination thereof. The aforementioned protective films can be selected from materials such as polyethylene terephthalate (PET) films, polyimide films, epoxy resin films, polyethylene films, and polypropylene films. The mentioned protective adhesives can be chosen from materials such as epoxy resin, UV-curable adhesive, two-component curing adhesive, conductive copper adhesive, and conductive silver adhesive.

Referring to FIG. 1, in some embodiments of this application, protective layer 3 is selected from protective films, and placing protective layer 3 on the conductive adhesive tape electrode involves directly setting a protective film on the conductive adhesive tape electrode.

Figure 2:
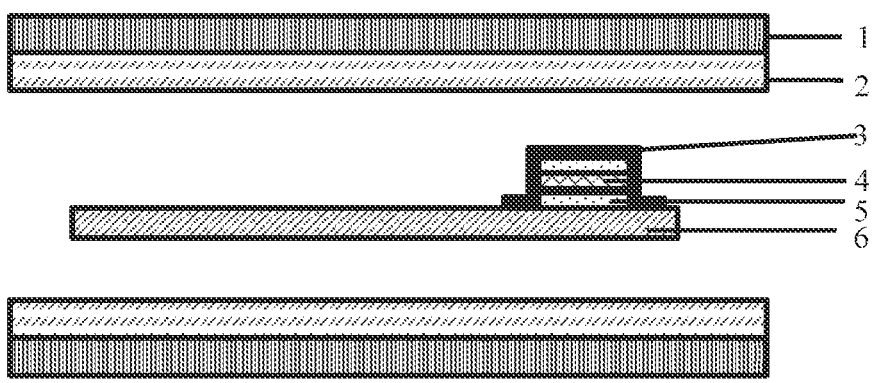
FIG. 2: A schematic diagram of the disassembled structure of laminated glass containing electronic devices, as prepared in Example 2 of this application.

Referring to FIG. 2, in some embodiments of this application, protective layer 3 is selected from protective films, and placing protective layer 3 on the conductive adhesive tape electrode involves placing a protective film on both surfaces of the conductive adhesive tape electrode with conductive adhesive 5. The protective film is pre-fixed onto one surface of the conductive adhesive tape electrode through conductive adhesive 5. This reduces the steps required for preparing the interlayer glass as proposed in this application and is beneficial for solving the problem of early failure of electronic devices in the completed interlayer glass in a cost-effective manner.

Figure 3:
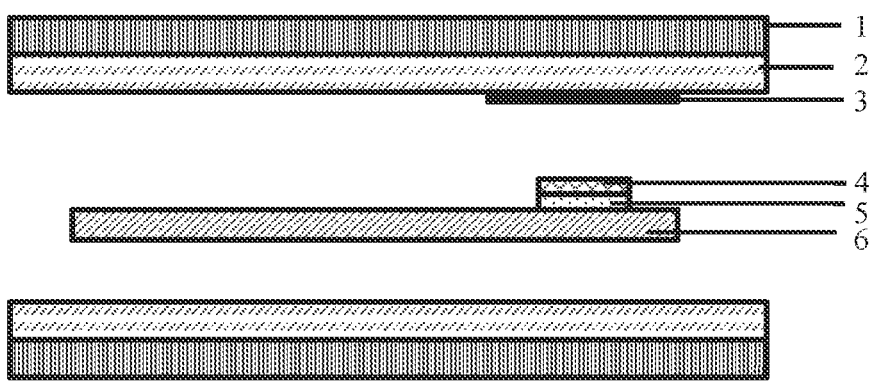
FIG. 3: A schematic diagram of the disassembled structure of laminated glass containing electronic devices, as prepared in Example 3 of this application.

Referring to FIG. 3, in some embodiments of this application, protective layer 3 is selected from protective films, and placing protective layer 3 on the conductive adhesive tape electrode involves pre-fixing the protective film 3 onto the side of glass 1 with interlayer adhesive 2 and at a location that corresponds to the conductive adhesive tape electrode. This enhances the efficiency of the interlayer process and is advantageous for addressing the problem of early failure of electronic devices in the completed interlayer glass in a cost-effective manner.

Figure 4:
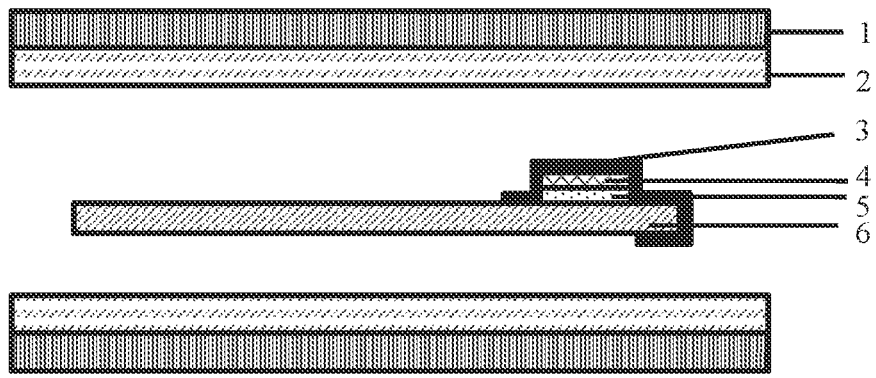
FIG. 4: A schematic diagram of the disassembled structure of laminated glass containing electronic devices, as prepared in Example 4 of this application.

Referring to FIG. 4, in some embodiments of this application, protective layer 3 is selected from protective films, and the protective film extends to the space between the conductive substrate and interlayer adhesive 2, partially covering the conductive substrate. This is beneficial for cost-effectively addressing the problem of early failure of electronic devices in the completed interlayer glass when dealing with irregular edges of the electronic devices.

Figure 5:
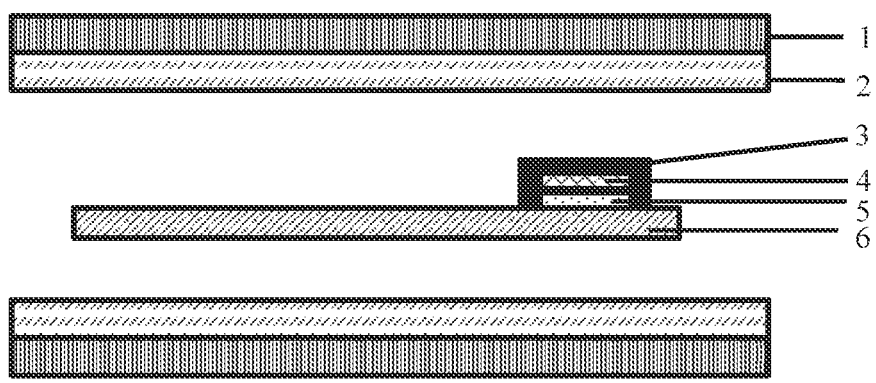
FIG. 5: A schematic diagram of the disassembled structure of laminated glass containing electronic devices, as prepared in Example 5 of this application.

Referring to FIG. 5, in some embodiments of this application, protective layer 3 is selected from protective adhesives, and placing protective layer 3 on the conductive adhesive tape electrode involves applying protective adhesive in a point-to-point manner on the conductive adhesive tape electrode and sealing the conductive adhesive tape electrode onto the conductive substrate. In situations where the conductive adhesive tape electrode is non-linear or inconvenient for protective film application, using protective adhesive is more efficient. The protective layer 3 formed after the curing of protective adhesive prevents plasticizers, additives, and external moisture and oxygen in the interlayer adhesive 2 from diffusing into the conductive adhesive tape electrode. When conductive copper adhesive or conductive silver adhesive is used for protective adhesive, aside from effectively protecting the conductive adhesive tape electrode, it can also enhance conductivity. This is advantageous for cost-effectively addressing the problem of early failure of electronic devices in the completed interlayer glass.

Figure 6:
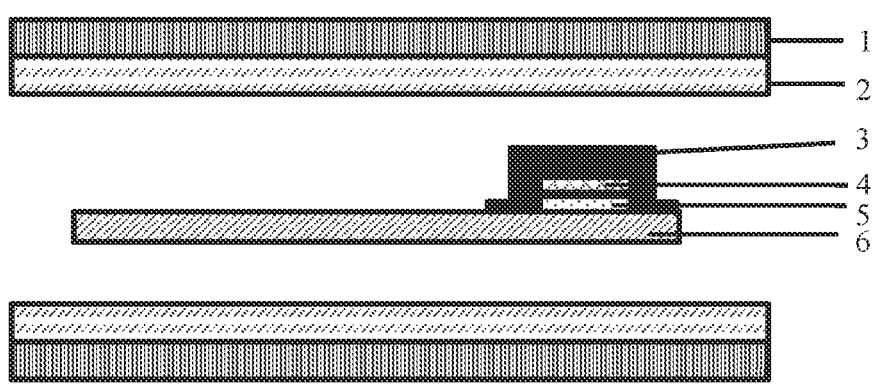
FIG. 6: A schematic diagram of the disassembled structure of laminated glass containing electronic devices, as prepared in Example 6 of this application.

Reference FIG. 6: In some embodiments of this application, protective layer 3 is selected from protective films and protective adhesives. Placing protective layer 3 on the conductive adhesive tape electrode involves applying protective adhesive in a point-to-point manner on the conductive adhesive tape electrode and sealing the conductive adhesive tape electrode onto the conductive substrate. The protective film covers the protective adhesive. After curing, the protective adhesive, along with the protective film, forms protective layer 3 to prevent the diffusion of plasticizers, additives, and external moisture and oxygen from interlayer adhesive 2 into the conductive adhesive tape electrode. This provides more effective protection to the conductive adhesive tape electrode. This is advantageous for a cost-effective solution to the problem of early failure of electronic devices in the completed interlayer glass.

Reference FIG. 7: In some embodiments of this application, the process for preparing interlayer glass containing electronic devices is as follows: (1) Cut the electronic device 6 to an appropriate size; (2) Trim the edges of the conductive substrate on the upper and lower sides of the electronic device 6 to obtain the bonding positions of the conductive adhesive tape electrode; (3) Treat the edges of the electronic device 6 to expose the transparent conductive layer on the conductive substrate; (4) Bond the conductive adhesive tape electrode and lead-out electrode 7 to the edges of the electronic device 6; (5) Place protective layer 3 on the conductive adhesive tape electrode, then press the electronic device 6 with protective layer 3 between two pieces of glass 1 with interlayer adhesive 2. Those skilled in the art should understand that the relative positions of the conductive substrate, conductive adhesive tape electrode, electronic device, and lead-out electrode shown in FIG. 7 are illustrative and not limiting to the invention. The relative positions of these parts can be adjusted according to actual circumstances. For instance, the lead-out electrode can be located at any position outside the glass.

In some embodiments of this application, electronic device 6 can be selected from liquid crystal devices, electrochromic devices, organic light-emitting devices, thin film heating devices, and thin film solar cell devices. The preparation of electronic device 6 is not particularly limited, as long as it achieves the purpose of this application. For example, the preparation of electronic device 6 can include preparing the conductive substrate, preparing the device body, preparing the conductive adhesive tape electrode, and preparing lead-out electrode 7.

EXAMPLES

The following examples and comparative examples provide more specific explanations of the embodiments of this application. Various tests and evaluations were conducted according to the methods described below. Unless otherwise specified, "parts" and "%" are based on weight.

Test Methods and Equipment:
Contact Resistance Test:

A multimeter was used to measure the initial contact resistance between the conductive adhesive tape electrode and the conductive substrate, as well as the contact resistance after aging for 7 days and 30 days in the electronic device.

Example 1

Conductive adhesive tape electrode and lead-out electrode were placed on the conductive substrate of a thin film heating device. The side of the conductive adhesive tape electrode in contact with the conductive substrate was coated with conductive adhesive, and the conductive adhesive tape electrode was connected to the lead-out electrode. A PET film with a thickness of 50 μm was chosen and cut to a size slightly larger than that of the conductive adhesive tape electrode. The obtained PET film was overlaid onto the conductive adhesive tape electrode of the thin film heating device and sealed onto the conductive substrate of the thin film heating device. The PET film extended between the conductive substrate and the interlayer adhesive, partially covering the conductive substrate. The lead-out electrode extended to the outside of the glass. Finally, compression was performed to form interlayer glass containing the thin film heating device.

Example 2

A PET film with a thickness of 50 μm was chosen and cut to a size slightly larger than that of the conductive adhesive tape electrode. The PET film was bonded to the side of the conductive adhesive tape electrode with conductive adhesive on both surfaces. Lead-out electrode 7 was placed on the conductive substrate of the thin film heating device. The conductive adhesive tape electrode with the protective layer was bonded to the conductive substrate of the thin film heating device, sealing the conductive adhesive tape electrode onto the conductive substrate with the PET film. The lead-out electrode extended to the outside of the glass. Finally, compression was performed to form interlayer glass containing the thin film heating device.

Example 3

Conductive adhesive tape electrode and lead-out electrode were placed on the conductive substrate of a thin film heating device. The side of the conductive adhesive tape electrode in contact with the conductive substrate was coated with conductive adhesive, and the conductive adhesive tape electrode was connected to the lead-out electrode. Interlayer adhesive 2 was placed on one side of the glass. A PET film with a thickness of 50 μm was chosen and cut to a size slightly larger than that of the conductive adhesive tape electrode. The obtained PET film was bonded onto the side of the glass with interlayer adhesive 2 corresponding to the conductive adhesive tape electrode. The thin film heating device with the protective layer was placed between two pieces of glass with protective layer 3, with interlayer adhesive 2 facing the thin film heating device. The PET film sealed the conductive adhesive tape electrode onto the conductive substrate of the thin film heating device. The lead-out electrode extended to the outside of the glass. Finally, compression was performed to form interlayer glass containing the thin film heating device.

Example 4

Conductive adhesive tape electrode was placed on the conductive substrate of a liquid crystal device. Lead-out electrode 7 was placed on the conductive adhesive tape electrode, and the side of the conductive adhesive tape electrode in contact with the conductive substrate was coated with conductive adhesive. The conductive adhesive tape electrode was connected to lead-out electrode 7. A PET film with a thickness of 50 μm was chosen and cut to a size slightly larger than that of the conductive adhesive tape electrode. The obtained PET film was overlaid onto the conductive adhesive tape electrode of the liquid crystal device and sealed onto the conductive substrate of the liquid crystal device. The lead-out electrode extended to the outside of the glass. Finally, compression was performed to form interlayer glass containing the liquid crystal device.

Example 5

Conductive adhesive tape electrode was placed on the conductive substrate of a liquid crystal device. Lead-out electrode 7 was placed on the conductive adhesive tape electrode, and the side of the conductive adhesive tape electrode in contact with the conductive substrate was coated with conductive adhesive. The conductive adhesive tape electrode was connected to lead-out electrode 7. Epoxy resin protective adhesive was applied in a point-to-point manner on the conductive adhesive tape electrode of the liquid crystal device, sealing the conductive adhesive tape electrode onto the conductive substrate of the liquid crystal device. After curing, the protective layer had a thickness of 100 μm. The lead-out electrode extended to the outside of the glass. Finally, compression was performed to form interlayer glass containing the liquid crystal device.

Example 6

Conductive adhesive tape electrode was placed on the conductive substrate of a liquid crystal device. Lead-out electrode 7 was placed on the conductive adhesive tape electrode, and the side of the conductive adhesive tape electrode in contact with the conductive substrate was coated with conductive adhesive. The conductive adhesive tape electrode was connected to lead-out electrode 7. A PET film with a thickness of 50 μm was chosen and cut to a size slightly larger than that of the conductive adhesive tape electrode. Epoxy resin protective adhesive was applied in a point-to-point manner on the conductive adhesive tape electrode of the liquid crystal device, sealing the conductive adhesive tape electrode onto the conductive substrate of the liquid crystal device. The obtained PET film was overlaid onto the epoxy resin protective adhesive, and after curing, the protective layer had a combined thickness of 150 μm with the PET film. The lead-out electrode extended to the outside of the glass. Finally, compression was performed to form interlayer glass containing the liquid crystal device.

Example 7

Except for substituting PET film with PI film, the remaining steps were the same as in Example 1.

Comparison Example 1: Conductive adhesive tape electrode and lead-out electrode were placed on the conductive substrate of a thin film heating device. The side of the conductive adhesive tape electrode in contact with the conductive substrate was coated with conductive adhesive, and the conductive adhesive tape electrode was connected to the lead-out electrode. The thin film heating device with protective layer was placed between two pieces of glass, with interlayer adhesive facing the thin film heating device. The lead-out electrode extended to the outside of the glass. Finally, compression was performed to form interlayer glass containing the thin film heating device.

Comparison Example 2: Conductive adhesive tape electrode and lead-out electrode were placed on the conductive substrate of a liquid crystal device. The side of the conductive adhesive tape electrode in contact with the conductive substrate was coated with conductive adhesive, and the conductive adhesive tape electrode was connected to the lead-out electrode. The liquid crystal device was placed between two pieces of glass, with interlayer adhesive facing the liquid crystal device. The lead-out electrode extended to the outside of the glass. Finally, compression was performed to form interlayer glass containing the liquid crystal device.

Performance parameters for each embodiment and comparison example are shown in Table 1.

TABLE 1

|  | Electronic Device | Protective Layer | Initial Contact Resistance | Contact Resistance After 7 Days Aging | Contact Resistance After 30 Days Aging |
|---|---|---|---|---|---|
| Example 1 | Thin Film Heating Device | PET Film | 0.5Ω | 0.5Ω | 0.5Ω |
| Example 2 | Thin Film Heating Device | PET Film | 0.5Ω | 0.5Ω | 0.5Ω |
| Example 3 | Thin Film Heating Device | PET Film | 0.5Ω | 0.5Ω | 0.5Ω |
| Example 4 | Liquid Crystal Device | PET Film | 0.5Ω | 0.5Ω | 0.5Ω |
| Example 5 | Liquid Crystal Device | Epoxy Resin Protective Adhesive | 0.5Ω | 0.5Ω | 0.5Ω |
| Example 6 | Liquid Crystal Device | PET Film + Epoxy Resin Protective Adhesive | 0.5Ω | 0.5Ω | 0.5Ω |
| Example 7 | Thin Film Heating Device | PI Film | 0.5Ω | ~100Ω | 10 kΩ |
| Comparison Example 1 | Thin Film Heating Device | — | 0.5Ω | ~1000Ω | >100 kΩ |
| Comparison Example 2 | Liquid Crystal Device | — | 0.5Ω | ~1000Ω | >100 kΩ |

Note:
"—" indicates not applicable.

From Example 1 to Example 7 and Comparison Example 1 to Comparison Example 2, it can be seen that when a protective layer is applied to the conductive adhesive tape electrode of the electronic device, within the range of thicknesses specified in this application, the initial contact resistance of the electronic device remains the same, while the contact resistance after 7 days and 30 days of aging is significantly lower. This indicates that the electronic devices remain conductive after 7 days and 30 days of aging after completion of the interlayer, remaining in normal working condition. This solves the problem of early failure of electronic devices in the completed interlayer glass within a short period of time, and the preparation method of this application is cost-effective.

The above description is only for the preferred embodiments of this application and should not be used to limit this application. Any modifications, equivalent substitutions, improvements, etc., made within the spirit and principles of this application should be included within the scope of protection of this application.

The invention claimed is:

1. A method for preparing laminated glass, wherein the laminated glass comprises an electronic device, the electronic device comprising a device body, a conductive substrate, a conductive adhesive tape electrode, and a lead-out electrode, the conductive adhesive tape electrode has at least one surface coated with conductive adhesive, the surface coated with the conductive adhesive is attached to the conductive substrate, the lead-out electrode is placed on the conductive adhesive tape electrode or the conductive substrate and is conductively connected to the conductive adhesive tape electrode, and the method for preparing the laminated glass comprises:

placing a protective layer on the conductive adhesive tape electrode, covering and sealing the conductive adhesive tape electrode onto the conductive substrate, wherein the protective layer has a size larger than a size of the conductive adhesive tape electrode, thereby preventing diffusion of plasticizers, additives, and external moisture and oxygen into the conductive adhesive tape electrode; and sandwiching the electronic device between two glass pieces and pressing the two glass pieces together to form the laminated glass comprising the electronic device, wherein adhesive patches are applied on a side of at least one of the two glass pieces facing the electronic devices, and the lead-out electrode extends to the outside of the two glass pieces.

2. The method according to claim 1, wherein the conductive adhesive is applied on both surfaces of the conductive adhesive tape electrode, and the protective layer is attached to the conductive adhesive tape electrode via the conductive adhesive.

3. The method according to claim 1, wherein a thickness of the protective layer is between 10 μm and 1000 μm.

4. The method according to claim 1, wherein the protective layer is selected from at least one of protective film and protective adhesive, the protective film comprising one of polyethylene terephthalate film, polyimide film, epoxy resin film, polyethylene film, or polypropylene film, and the protective adhesive comprising one of epoxy resin, UV-curable adhesive, two-component epoxy adhesive, conductive copper adhesive, or conductive silver adhesive.

5. The method according to claim 1, wherein the protective layer is a protective film, and the placing the protective layer on the conductive adhesive tape electrode comprises directly placing the protective film on the conductive adhesive tape electrode.

6. The method according to claim 1, wherein the protective layer is a protective film, and the placing the protective layer on the conductive adhesive tape electrode comprises pre-fixing the protective film on one surface of the conductive adhesive tape electrode using the conductive adhesive.

7. The method according to claim 1, wherein the protective layer is a protective film, the placing the protective layer on the conductive adhesive tape electrode comprises pre-fixing the protective film (1) on the side of at least one of the two glass pieces that has the adhesive patches applied and (2) at a location corresponding to conductive adhesive tape electrode.

8. The method according to claim 1, wherein the protective layer is a protective film, and extends between the conductive substrate and the adhesive patches and partially covers the conductive substrate.

9. The method according to claim 1, wherein the protective layer is a protective adhesive, and setting the protective layer on the conductive adhesive tape electrode includes applying the protective adhesive in a point-to-point manner to cover and seal the conductive adhesive tape electrode onto the conductive substrate.

10. The method according to claim 1, wherein the protective layer comprises protective film and protective adhesive and setting the protective layer on the conductive adhesive tape electrode includes applying the protective adhesive in a point-to-point manner to cover and seal the conductive adhesive tape electrode onto the conductive substrate, with the protective film covering the protective adhesive.

11. The method according to claim 1, wherein the electronic device is selected from one of liquid crystal device, electrochromic device, organic light-emitting device, thin-film heating device, or thin-film solar cell device.

12. A laminated glass, comprising:
   an electronic device,
   a protective layer, and
   two glass pieces,
   wherein:
      the electronic device comprises a device body, a conductive substrate, an conductive adhesive tape electrode, and a lead-out electrode, the conductive adhesive tape electrode has at least one surface coated with conductive adhesive, the surface with the conductive adhesive is combined with the conductive substrate, the lead-out electrode is placed on the conductive adhesive tape electrode or the conductive substrate and is conductively connected to the conductive adhesive tape electrode,
      the protective layer is placed on the conductive substrate to cover and seal the conductive adhesive tape electrode onto the conductive substrate, wherein the protective layer has a size larger than a size of the conductive adhesive tape electrode, thereby preventing diffusion of plasticizers, additives, and external moisture and oxygen into the conductive adhesive tape electrode, and
      the electronic device is sandwiched between the two glass pieces, and the two glass pieces are pressed together to form the laminated glass comprising the electronic device, wherein adhesive patches are applied on a side of at least one of the two glass pieces facing the electronic devices, and the lead-out electrode extends to the outside of the two glass pieces.

13. The laminated glass of claim 12, wherein the conductive adhesive is applied on both surfaces of the conductive adhesive tape electrode, and the protective layer is attached to the conductive adhesive tape electrode via the conductive adhesive.

14. The laminated glass of claim 12, wherein the protective layer is selected from at least one of protective film and protective adhesive, the protective film comprising one of polyethylene terephthalate film, polyimide film, epoxy resin film, polyethylene film, or polypropylene film, and the protective adhesive comprising one of epoxy resin, UV-curable adhesive, two-component epoxy adhesive, conductive copper adhesive, or conductive silver adhesive.

* * * * *